Figure 1:
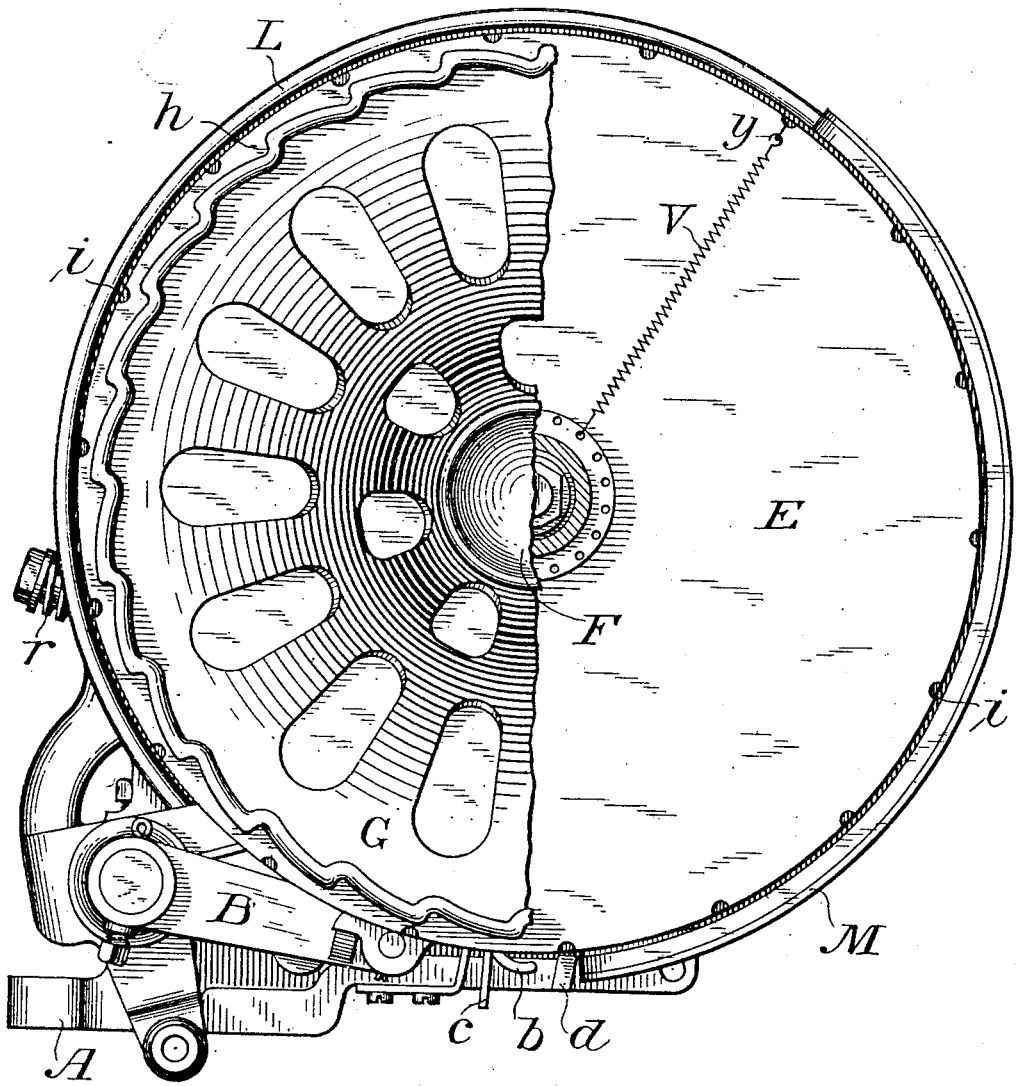

No. 873,467. PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 1.

Witnesses
Jas. S. Latimer
Eugene W Bond

Inventor
Melvin L. Stone
by Arthur F. Brown
Attorney

No. 873,467. PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 2.

Witnesses
Jas. S. Latimer
Eugene W. Bond

Inventor
Melvin L. Stone
by Arthur F. Brown
Attorney

No. 873,467. PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 3.

Witnesses
Jas. S. Latimer
Eugene W. Bond

Inventor
Melvin L. Stone
by
Attorney

No. 873,467. PATENTED DEC. 10, 1907.
M. L. STONE.
ROTARY MAGAZINE FOR WEFT REPLENISHING LOOMS.
APPLICATION FILED FEB. 16, 1906.
7 SHEETS—SHEET 4.
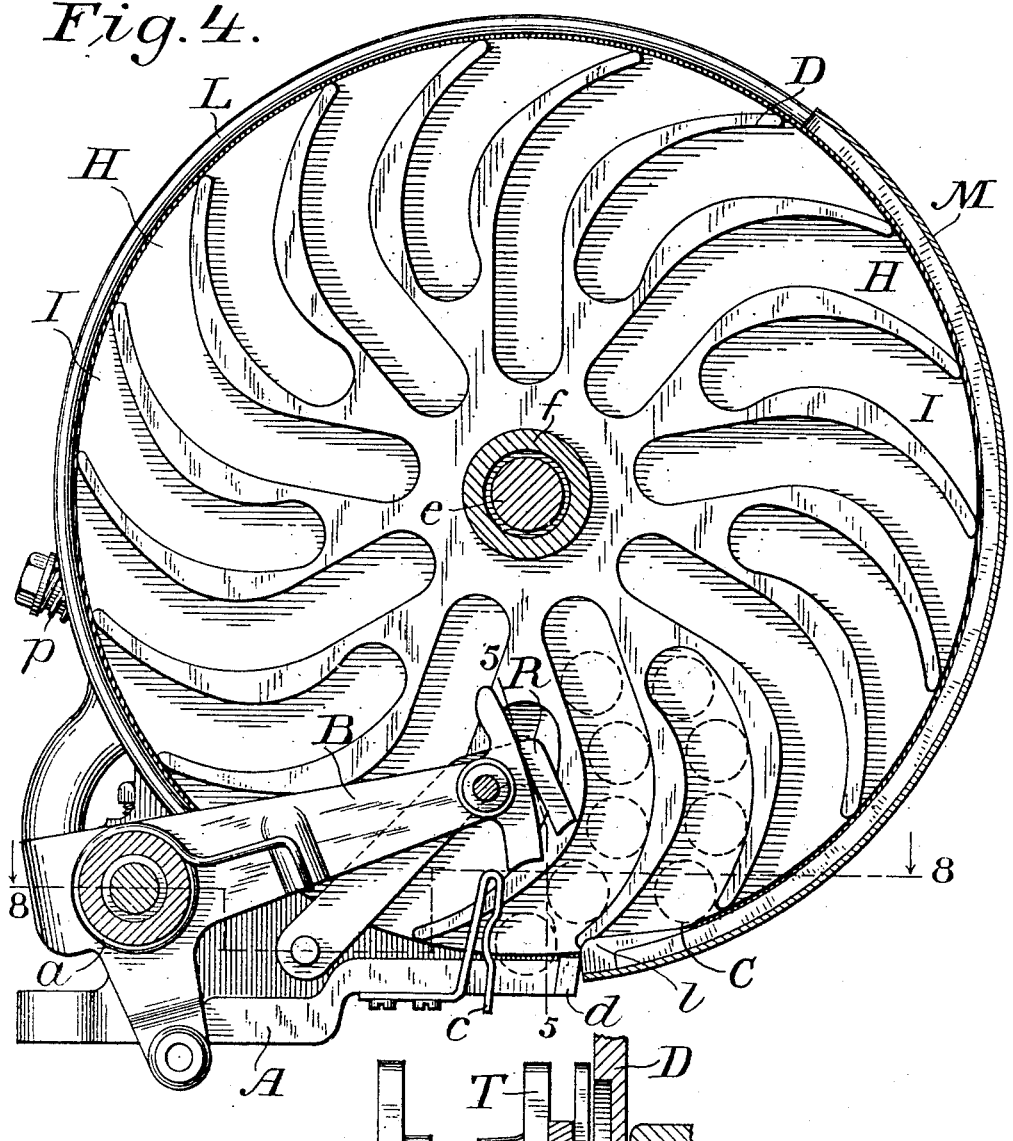
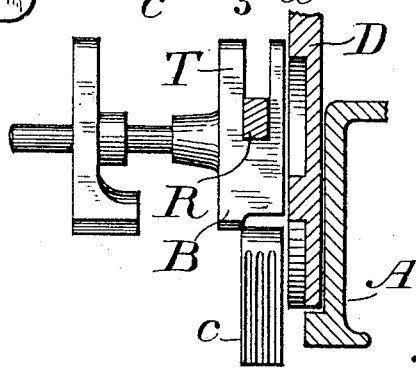
Witnesses
Jos. S. Latimer
Eugene W. Bond
Inventor
Melvin L. Stone
by
Attorney No. 873,407. PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 5.

Witnesses
Jas. S. Latimer
Eugene W. Bond

Inventor
Melvin L. Stone
by Arthur P. Brown
Attorney

No. 873,467.
PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 6.

Witnesses
Jas. S. Latimer
Eugene W. Bond

Inventor
Melvin L. Stone
by Arthur F. Brown
Attorney

No. 873,467. PATENTED DEC. 10, 1907.
M. L. STONE.
ROTARY MAGAZINE FOR WEFT REPLENISHING LOOMS.
APPLICATION FILED FEB. 16, 1906.

7 SHEETS—SHEET 7.

Witnesses
Jos. S. Latimer
Eugene W. Bond

Inventor
Melvin L. Stone
by Arthur P. Browne
Attorney

UNITED STATES PATENT OFFICE.

MELVIN L. STONE, OF LOWELL, MASSACHUSETTS, ASSIGNOR TO DRAPER COMPANY, OF HOPEDALE, MASSACHUSETTS, A CORPORATION OF MAINE.

ROTARY MAGAZINE FOR WEFT-REPLENISHING LOOMS.

No. 873,467. Specification of Letters Patent. Patented Dec. 10, 1907.

Application filed February 16, 1906. Serial No. 301,406.

*To all whom it may concern:*

Be it known that I, MELVIN L. STONE, of Lowell, in the county of Middlesex and State of Massachusetts, have invented a new and Improved Rotary Magazine for Weft-Replenishing Looms, of which the following is a specification.

The well-known Northrop loom as commercially used is provided with a rotary hopper or magazine which carries spare weft-carriers, as illustrated in United States patent of J. H. Northrop, No. 529,940, November 27, 1894. This rotary magazine supports weft-carriers only at its periphery.

The primary object of the present invention is to increase the weft-carrier holding capacity of such a rotary magazine, so that the refilling of the magazine with fresh weft-carriers need be attended to only at long intervals.

A rotary magazine provided with the present improvement can support sufficient weft-carriers to supply the loom for an entire day without increasing the size of the rotary magazine. By the present improvement, the capacity of the magazine is increased about threefold without any increase in its size. Obviously, this increases the number of looms which a single weaver can attend. Moreover, it renders it possible to replenish the magazine between closing down of the mill for the night and reopening it in the morning, so that the weaver need give no attention to the replenishing of the magazine, and it can be done without interfering in any way with the work of the weaver.

The present improvement in connection with the increased capacity of the rotary magazine is also accompanied by an improvement in the manner in which the weft-ends are taken care of and also in the manner in which the rotary magazine is rotated step by step.

Figure 2:
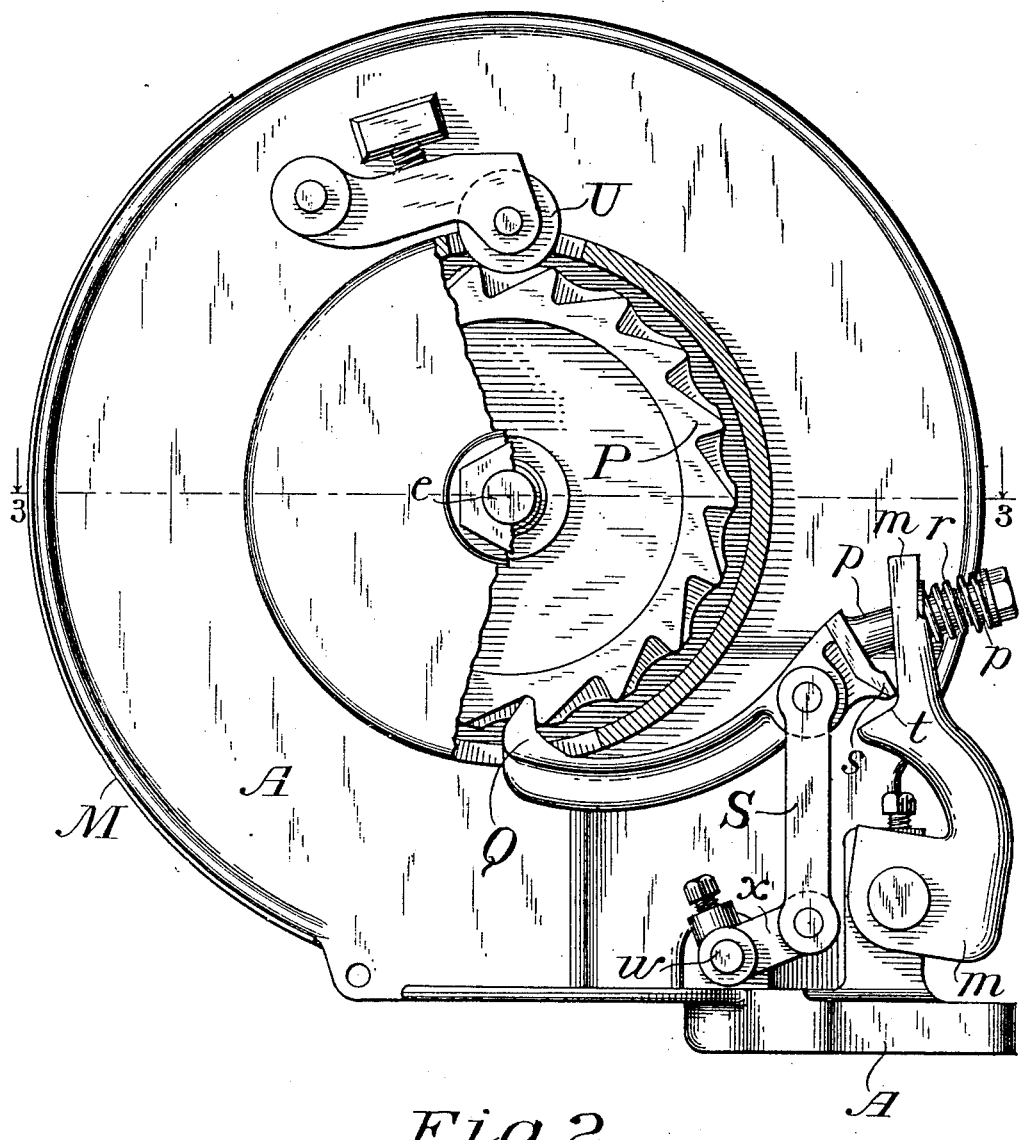
Figure 3:
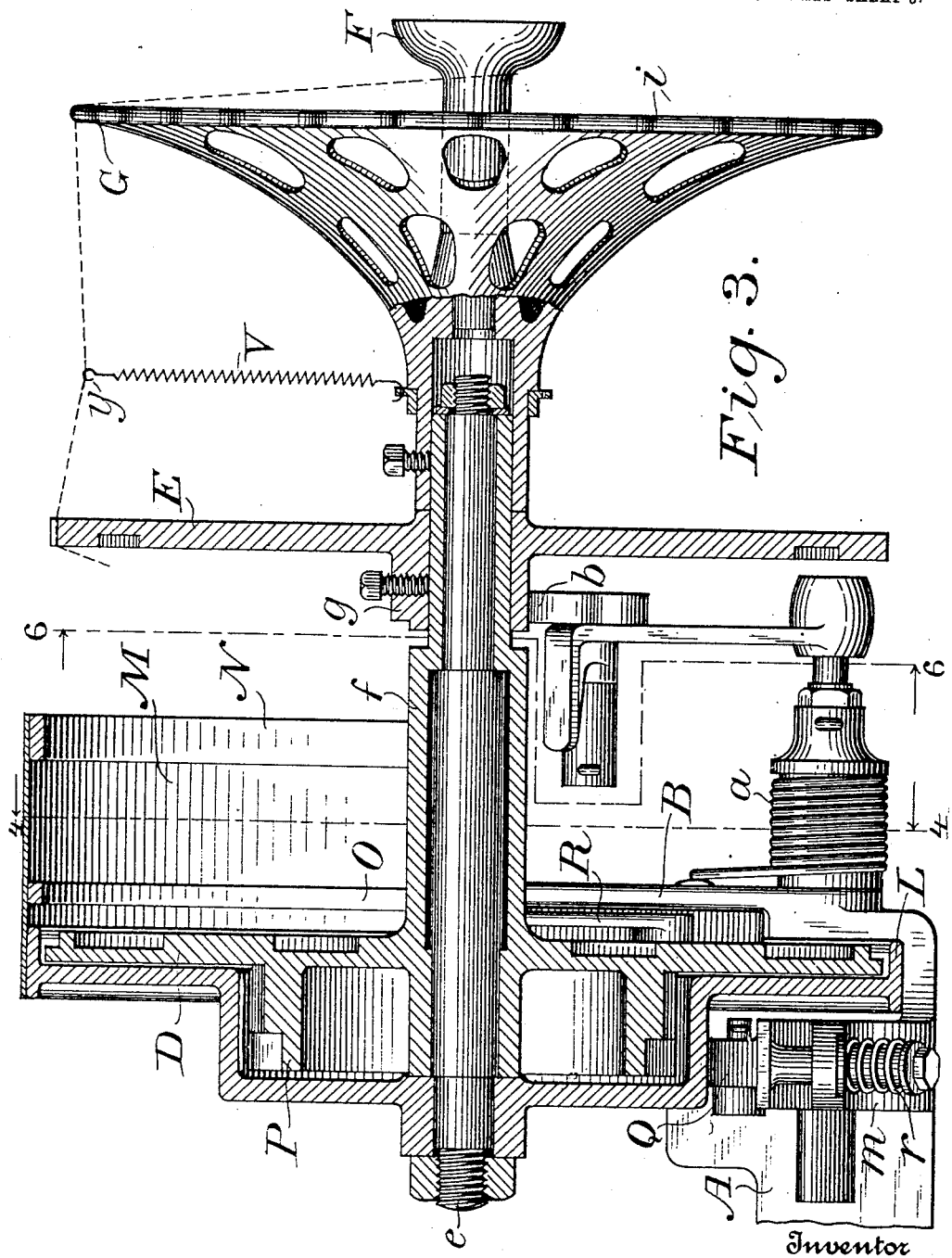
Figure 6:
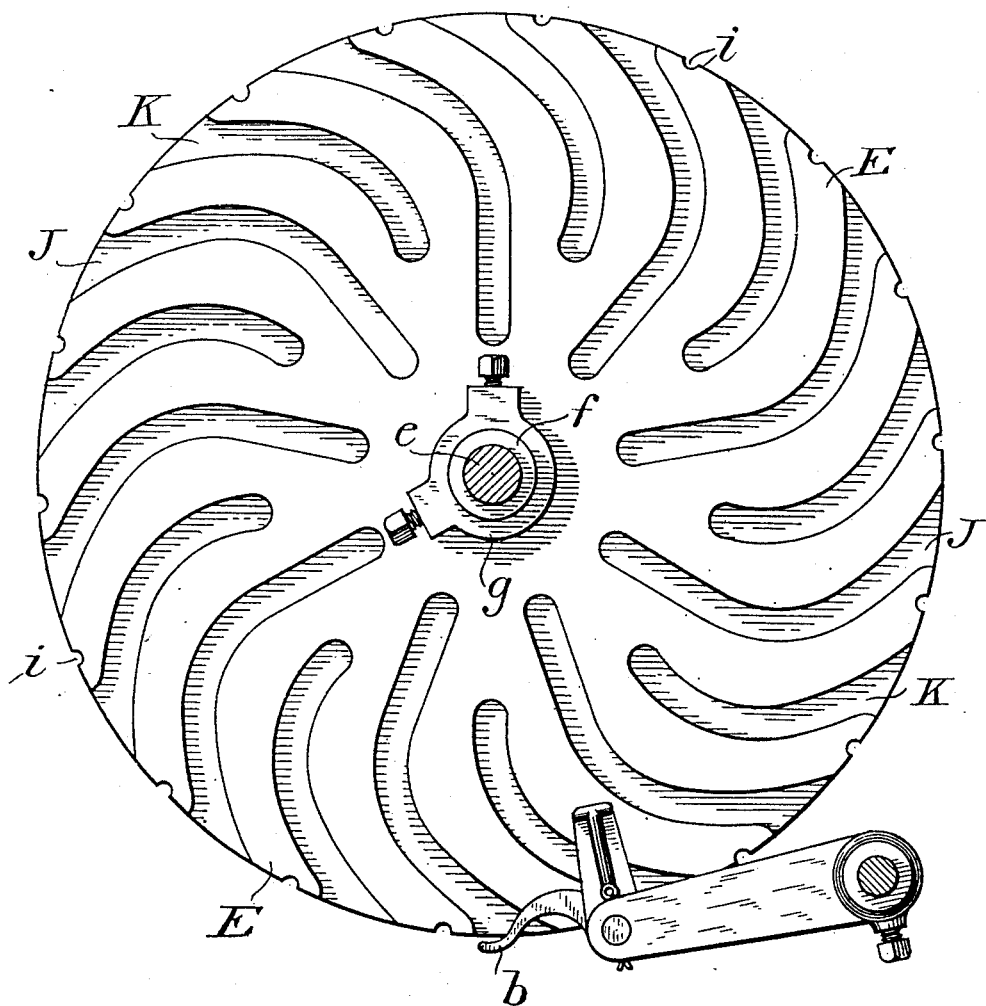
Figure 7:
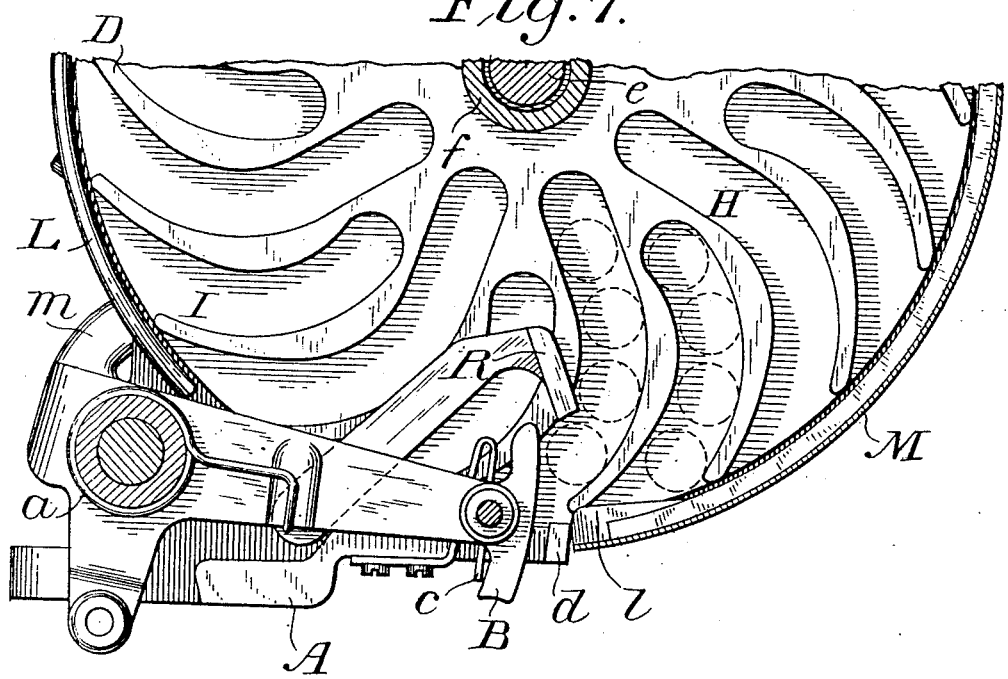
Figure 8:
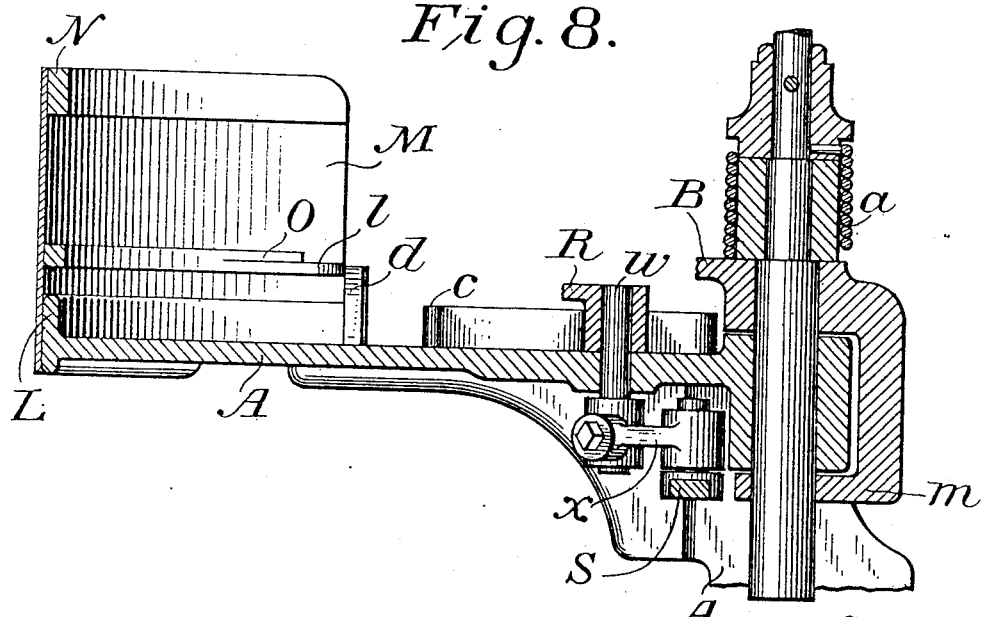
Figure 9:
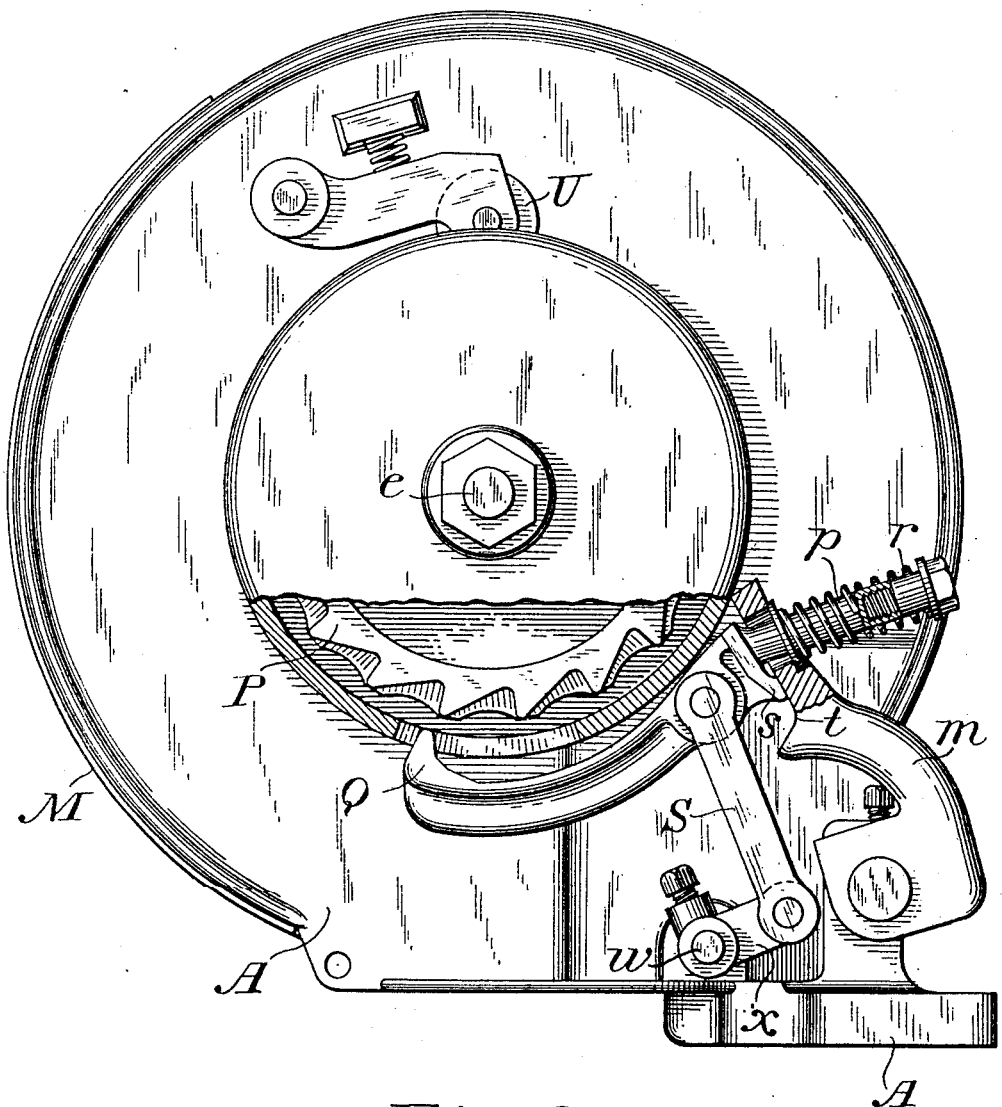

One embodiment of the present invention is illustrated in the accompanying drawings, in which:

Figure 1, is a view of the outer end of the improved rotary magazine and its supporting bracket, a portion of the thread-guide disk and of the thread-holder being broken away. Fig. 2, is a view looking toward the further side of the supporting bracket, a portion of the supporting bracket being shown in vertical section. In Fig. 2, the shank $p$ of the pawl Q, is shown foreshortened by breaking out a portion to enable the scale to conform to that of the other figures. Fig. 1, also shows this shank $p$, as in Fig. 2. Fig. 3, is a horizontal cross-section in the plane indicated by the line 3—3 in Fig. 2, and looking down, a portion of the thread-guide disk and all of the thread-holder being shown in plan. Fig. 4, is a vertical section in the plane indicated by the line 4—4 in Fig. 3, and looking in the direction of the arrow 4. Fig. 5, is a detail vertical section of part of the magazine and its supporting brackets and looking toward the transferrer. Fig. 6, is a vertical section in the plane indicated by the line 6—6 in Fig. 3, and looking in the direction of the arrow 6. Fig. 7, is a view of a portion of the same parts which are illustrated in Fig. 4, but showing the transferrer in its depressed position. Fig. 8, is a detail horizontal section in the plane indicated by the line 8—8 in Fig. 4, and looking down, the magazine not being shown. Fig. 9, is a detail view of the same parts which are shown in Fig. 2, their position being that which they occupy when the transferrer is down and the weft-carrier feeler is maintained partly uplifted by a weft-carrier, certain parts being also shown in section.

The rotary hopper is supported upon a stationary bracket or framework A, which is adapted to be bolted or otherwise rigidly secured to any fixed part of the framework of the loom, such as one end of the breast-beam. This bracket is so located in the usual manner that the rotary magazine is over the shuttle box at one end of the lay when the lay is at front center. This bracket supports, as usual, an oscillating transferrer B of usual construction which is moved downwardly in well-known manner to transfer a fresh weft-carrier into weaving position on the loom when the condition of the running weft demands; and, after the transfer, it is restored to its normal uplifted position by a usual spring $a$.

Weft carriers are indicated at C in dotted lines in several figures of the drawings and are of usual construction. The lowermost weft-carrier in the magazine occupies a position immediately below the normally uplifted transferrer B, as indicated in Fig. 4 and it is maintained in this position by customary means, such as the yielding finger $b$, (Figs. 3 and 6) which supports the tip of the lowermost weft-carrier, the yielding spring abutment c, (Figs. 4, 5 and 8) secured directly to the bracket A, and the stationary rest d (Figs. 4 and 8) constituting a part of the bracket. When the transferrer descends, the tip-supporting finger and the spring abutment yield to permit the downward discharge of the lowermost weft-carrier. In Figs. 4, and 7, the indicated weft-carriers are not shown in contact with each other, nor with the abutment c, and rest d, in Fig. 4, nor with the rear face of the transferrer B in Fig. 7. This is because the dotted circles indicate the extreme butts of the weft-carriers, and the weft-carriers illustrated have rings projecting beyond the butts which contact with each other and with the said parts B, c, d, and O, and hence keep the butts spaced as illustrated. These rings are such as once commonly employed in looms wherein the automatic replenishment is effected by ejecting the spent weft-carrier in the working shuttle, and inserting a fresh one. Such rings are shown, for example in United States Letters Patent of Northrop No. 454,810, June 23, 1891.

The rotary hopper consists of two parallel disks, D, E. The inner disk D, supports the weft-carrier butts while the outer disk E, supports the weft-carrier tips. These disks are mounted to rotate in unison on the bracket A. To this end, the stationary bracket carries a stationary horizontal spindle e, (Fig. 3) upon which the hub f, of the inner disk D, is journaled. The outer disk E, has a central sleeve g, which is fastened to the hub of the inner disk so as to rotate in unison therewith. Also secured to the hub f, outside of the outer disk, is a holder F, for the weft-ends and a thread-guide disk G, having thread notches h, (Fig. 1) over which the weft-ends pass on their way from the weft-carriers in the magazine to the weft-end holder.

As thus far described, the mechanism is not materially different from prior rotary magazines.

The first and primary improvement consists in the construction of the rotary magazine so that it may hold an increased number of spare weft-carriers. This increased capacity is primarily due to the new construction of the outer and inner disks D, and E. The inner disk D, is provided with a plurality of butt-holding channels H, and I, (Fig. 4) which are alike except that the channels H, are longer than the channels I. Each channel H, and I, is open at the periphery of the disk and is closed at its end nearest the hub f. Every other channel H, is a long channel, extending as far as practicable toward the hub f; whereas, the intermediate channels I, are smaller, but as long as the spaces between the large channels H, will permit. In this way, the maximum amount of the surface of the disk D, is occupied by the butt-holding channels. In the specific embodiment of the magazine which is illustrated in the drawings, the disk D, is fourteen inches in diameter and is adapted to receive weft-carrier butts which are one inch in diameter where they enter the channels H, and I. With such dimensions, the disk has ten channels H, and ten channels I, and each channel H, holds the butts of five weft-carriers, while each channel I, holds the butts of four weft-carriers. When the magazine is filled to its maximum capacity with weft-carriers, two of the channels are not supplied with weft-carriers since it is necessary to leave room for the transferrer, as is evident from Fig. 4. Accordingly, with the illustrated dimensions, the magazine holds seventy-two spare weft-carriers which, with ordinary numbers of weft, suffices to supply a loom for more than an entire day's work. With larger sizes of thread, the magazine would preferably be larger so as to hold a larger number of weft-carriers.

Each large channel H, is substantially radial at its inner end. At its outer end, each large channel as well as each small channel I, is curved forwardly, using the expression "forwardly" to indicate the direction of rotation of the magazine. Owing to this shape of the channels, the channels which are immediately above the transferrer can hold weft-carrier butts in place without the employment of any additional guard, and accordingly, the front part of the magazine is unobstructed and hence available for the ready insertion of the weft-carriers. At the same time, owing to this shape, the weft-carriers which are held in the channel which, for the time being, is the "active" channel, can feed down in said channel by gravity. The channel called the "active" is the one whose outermost weft-carrier is immediately beneath the transferrer B, ready to be transferred into weaving position on the loom.

The outer disk E, has long and short channels J, and K, (Fig. 6) corresponding in number and relative arrangement to the long and short channels on the inner disk D, the difference being that the channels J, and K, are of suitable width to receive and guide the tips of the weft-carriers. Intermediate between the mouths of the several channels J, and K, the outer disk E, is provided with thread-holding guiding notches i, for the weft-ends on their way from the weft-carriers to the thread guide disk G, and the weft-end-holder F. Each long channel J, in the outer disk coöperates with a long channel H, in the inner disk to constitute a long guide-way for a group of weft-carriers in which the weft-carriers may be carried to the active position, and may feed down by gravity when at such position. Likewise each pair of short channels I and K also constitute a short guide-way having similar office and operation.

The shape of the several channels H, I, J, and K, constituting the weft-carrier guide-ways, is such that the weft-carriers are maintained in place without any guard for about half the number of guide-ways, thus affording free space for the insertion of the weft-carriers. To prevent accidental jarring out of the weft-carriers, however, the bracket A, is provided with a flange L, which extends over the mouths of all of the channels H, and I, in the inner butt-holding disk D, from the level of the top of the elevated transferrer B, (Fig. 4) around to the fixed rest $d$. This flange does not, however, interfere with the ready insertion of the weft-carriers, which are inserted by first placing their butts in the appropriate channels H, and I, and then slipping their tips into the open mouths of the corresponding channels K, and J, in the outer disk E. The weft-carriers are prevented from falling out through the open mouths of the guide-ways at the descending side of the rotary magazine by means of a fixed curved guard M. This guard M, is secured to the outer face of the flange L, and extends upwardly from the fixed rest $d$, far enough to prevent any of the weft-carriers dropping out from their guide-ways by gravity. This guard does not necessarily extend all the way across between the disks D, and E. It is provided on its inner face with two ribs N, and O, with which the several weft-carriers at the periphery of the magazine come in contact and by which they are supported. The inner rib O comes in contact with the butts of the weft-carriers, while the outer rib comes in contact with the body of weft carried by the weft-carrier. The inner rib O, has at its lower end a rising cam $l$, (Fig. 7) to carry the peripheral weft-carriers over the fixed stop $d$, and against the spring abutment $c$, as the magazine rotates.

Prior rotary magazines for weft-replenishing looms have been organized so as to rotate forward one step as each weft-carrier is transferred to the loom so as to bring successive weft-carriers into coöperation with the transferrer. Obviously, this organization is inapplicable to the present improvement. With the present arrangement, the organization is such that the magazine is rotated forwardly one step only after all of the weft-carriers occupying one of the guide-ways have been transferred. Each guide-way when brought into active position remains there until all of the contained weft-carriers have been transferred and the stack of weft-carriers in each active guide-way is fed downwardly by gravity. After each active guide-way has been emptied, then the rotary magazine is fed forward one step to bring the next following guide-way into active position. For this purpose, appropriately controlled mechanism is employed for rotating the magazine step by step after the exhaustion of the weft-carriers in the active guide-way. The inner disk D, of the rotary magazine has on its rear side a ratchet wheel P, having as many teeth as there are channels H, and I; in the illustrated instance, having twenty such teeth. With this coöperates an actuating pawl Q. This pawl is operatively connected with the transferrer B. The transferrer B, has an integral arm $m$, which extends to the rear side of the bracket, as shown in Figs. 2, and 8, and carries the pawl Q. The pawl has a shank $p$, extending loosely through a hole in the transferrer arm $m$, and is surrounded by a coiled spring $r$, which bears at one end against the adjustable head of the shank and at its other end against a washer at the outer face of the arm $m$. The pawl Q, also has a fulcrum edge $s$, which loosely fulcrums upon a bearing seat $t$, on the rear face of the transferrer arm $m$. The pawl is thus yielding and loosely connected to the transferrer arm and is capable of rocking on its fulcrum. When the pawl Q, is free to act, it feeds the magazine one step on the action of the transferrer. When the transferrer descends, the arm $m$, and the pawl Q, swing backwardly (to the left in Fig. 2) until the tooth of the pawl passes behind the next succeeding ratchet tooth of the ratchet wheel P, whereupon the spring $r$, swings the pawl upwardly on its fulcrum so that the pawl engages the next ratchet tooth and then, on the elevation of the transferrer, the forward movement of the pawl rotates the magazine one step, thus bringing the next pair of channels into action. The organization, however, is such that the pawl Q, can engage a fresh tooth on the ratchet wheel P, only when the last weft-carrier in the active guide-way is being transferred into weaving position on the loom. For this purpose, the action of the pawl Q, is controlled by a weft-carrier feeler R. This feeler R, is located between the transferrer and the disk D. It is fixed to a rock-shaft $w$, journaled in the bracket A, and extending therethrough. This feeler extends farther back than the transferrer so as to be normally just above the next to the lowest weft-carrier in the active guide-way, as shown in Fig. 4. The feeler rock-shaft $w$, at its outer end has secured to it a crank arm $x$, (Figs. 2, and 9) which is connected with the pawl Q by an intermediate link S, this link being pivotally connected at opposite ends to said pawl and crank arm. Now, when the transferrer descends to transfer the lowermost weft-carrier into weaving position, the feeler R, under the influence of the pawl spring $r$, descends and feels for the presence of a weft-carrier below it. If there is a weft-carrier below it, then its downward movement is stopped, thus preventing the spring r, from swinging the pawl sufficiently to engage the next tooth on the ratchet wheel P, as shown in Fig. 9. If, however, the last weft-carrier in the active guide-way is being transferred, then there will be no weft-carrier in the path of the feeler R, to stop its descent and, accordingly, the spring r, is free to swing the pawl Q, into engagement with the next tooth of the ratchet P. Accordingly, under these circumstances, when the transferrer next rises, the magazine will be rotated one step so as to bring the weft-carrier in the next following guide-way into active position. So long, however, as the active guideway contains spare weft-carriers, the feeler R, will encounter a weft-carrier and thereby prevent the magazine rotating pawl from acting.

In connection with this magazine actuating mechanism, there are some features requiring consideration. The transferrer is constructed in a known manner so as to uphold the stack of spare weft-carriers in the active guideway during the transfer of the lowermost weft-carrier. This is of importance in connection with the action of the feeler R, since the weft-carrier with which the feeler comes in contact is prevented from downward movement under the stress of the feeler. When the transferrer again resumes its normal uplifted position, it is wholly out of the path of the active stack of weft-carriers so that they then drop down of gravity until supported by the spring abutment c, stationary rest d, and tip supporting finger b.

The transferrer has a fork T, (Fig. 5) at its rear end which is occupied by the shank of the feeler R. This fork is open at the top and closed at the bottom and it not only acts as a guide for the free end of the feeler, but also insures the ascent of the feeler with the transferrer during the feeding of the magazine. Normally, when the transferrer is uplifted, the shank of the feeler bears against the bottom of this fork under the tension of the spring r. The transferrer moves farther down than the feeler and when it returns, the bottom of this fork encounters the feeler and swings it up into normal uplifted position and thus retains the spring r, under tension. In this connection, it will be noted the transferrer elevating spring a, is more powerful than the pawl controlling spring r.

The magazine is maintained in its different positions by means of a spring-controlled roller detent U, (Fig. 2) which bears on the sinuous periphery of the ratchet wheel P.

The weft-ends from the stack of weft-carriers in each guide-way are all passed in a group in one of the thread notches i, in the outer tip holding disk E, and in one of the notches h, in the thread guide disk G, and are then fastened to the thread-holder F. As the weft-carriers are fed by gravity in the active guide-way, their threads would become slack and, to prevent this, a slack thread controller V is employed in connection with the group of weft-ends. Each slack-thread controller consists of a coiled spring which is attached at one end to the hub of the thread guide disk G. The other end of this slack-thread controller has a hooked end y, which can be hooked over the group of threads passing from one notch i, to the corresponding notch h, (see dotted line Fig. 3). When the group of threads has been arranged in place, the corresponding elastic slack-thread controller is strained and hooked over the group of threads. Thus, as fast as the stack of active weft-carriers is fed along by gravity, their slackened threads are taken up by the contraction of the elastic slack-thread controller.

It is obvious that numerous changes can be made in the details of construction without departing from the principles of invention.

I claim:—

1. An automatic weft-replenishing loom having a rotary magazine provided with a plurality of guideways, each capable of holding a plurality of weft-carriers, the weft-carriers in the several guide-ways feeding therefrom in the same direction.

2. An automatic weft-replenishing loom having, in combination, a rotary magazine provided with a plurality of guide-ways each capable of holding a plurality of weft-carriers, and automatic means for rotating the magazine always in the same direction.

3. An automatic weft-replenishing loom having a rotary magazine provided with a plurality of guide-ways, each capable of holding a plurality of weft-carriers, and each extending from the periphery towards the axis of the magazine.

4. An automatic weft-replenishing loom having, in combination, a transferrer; a rotary magazine provided with a plurality of guide-ways each capable of holding a plurality of weft-carriers, the active guide-way being in position to coöperate with the transferrer and the weft-carriers feeding by gravity in the active guide-way at each action of the transferrer; a weft-carrier feeler which feels for weft-carriers in the active guide-way at each action of the transferrer, and which has an additional functional movement when the active guide-way is empty; and automatic means governed by said functional movement of the feeler to rotate the magazine the necessary distance to bring the next following guide-way into active position, the feed of the magazine due to the feeler being always in the same direction.

5. An automatic weft-replenishing loom having a rotary magazine provided with two disks each having a plurality of channels extending from the periphery towards the axis of the magazine, the channels in one disk being adapted to receive the butts of weft-carriers, and those in the other to receive the weft-carrier tips.

6. An automatic weft-replenishing loom having a rotary magazine provided with a plurality of guide-ways, each capable of holding a plurality of weft-carriers and each extending from the periphery towards the axis of the magazine, the outer end of each guide-way inclining forwardly in the direction of the rotation.

7. An automatic weft-replenishing loom having a rotary magazine provided with a plurality of guide-ways, each capable of holding a plurality of weft-carriers and each extending from the periphery towards the axis of the magazine, the guide-ways being alternately long and short thereby utilizing the available space of the magazine.

8. An automatic weft-replenishing loom having, in combination, a rotary magazine having a plurality of guide-ways, each capable of holding a plurality of weft-carriers, each extending from the periphery toward the axis of the magazine, and each being open at the periphery of the magazine, and a guard opposite the descending side of the rotary side of the magazine to prevent the escape of the weft-carriers from the guide-ways.

9. An automatic weft-replenishing loom having, in combination, a rotary magazine having a plurality of guide-ways, each capable of holding a plurality of weft-carriers, each extending from the periphery toward the axis of the magazine, and each having a mouth open at the periphery, and a fixed flange which extends around the magazine at one end only of the magazine, partly closing said open mouths of the guide-ways, thus necessitating the endwise insertion of the weft-carriers into the magazine, and aiding in preventing accidental displacement of the weft-carriers from the guide-ways.

10. A rotary magazine having a ratchet wheel, a spring controlling pawl coöperating with said ratchet wheel to feed the magazine forward step by step, a weft-carrier feeler which ascertains the condition of the weft-carriers of the magazine, and intermediate connections between said feeler and said pawl, whereby when the movement of said feeler is stopped by the presence of a weft-carrier in its path the pawl is maintained out of coöperation with the ratchet, but when said feeler has an additional movement due to the absence of a weft-carrier in its path, said pawl coöperates with said ratchet to feed the magazine forward one step.

11. An automatic weft-replenishing loom having, in combination, a magazine for spare weft-carriers, a weft-end holder, intermediate thread guides between the weft-carriers and the weft-end holders over which the threads are carried in groups from the weft-carriers to the weft-end holders, and an elastic slack thread controller adapted to be connected with each group of weft-ends.

12. An automatic-weft-replenishing loom having, in combination, a weft-end holder, and an elastic slack thread controller connected with a thread extending from a weft-carrier to the weft-end holder.

In witness whereof, I have hereunto signed my name in the presence of two subscribing witnesses.

MELVIN L. STONE.

Witnesses:
GEORGE OTIS DRAPER,
ERNEST W. WOOD.